(12) United States Patent
Schellekens et al.

(10) Patent No.: US 12,084,535 B2
(45) Date of Patent: Sep. 10, 2024

(54) PROCESS FOR PREPARING WATERBORNE DISPERSION

(71) Applicant: COVESTRO (NETHERLANDS) B.V., Nieuwegein (NL)

(72) Inventors: Michael Arnoldus Jacobus Schellekens, Echt (NL); Johannes Hendrikus De Bont, Echt (NL); Gerardus Cornelis Overbeek, Echt (NL)

(73) Assignee: Covestro (Netherlands) B.V., Nieuwegein (NL)

( * ) Notice: Subject to any disclaimer, the term of this patent is extended or adjusted under 35 U.S.C. 154(b) by 589 days.

(21) Appl. No.: 17/426,799

(22) PCT Filed: Jan. 29, 2020

(86) PCT No.: PCT/EP2020/052149
§ 371 (c)(1),
(2) Date: Jul. 29, 2021

(87) PCT Pub. No.: WO2020/157121
PCT Pub. Date: Aug. 6, 2020

(65) Prior Publication Data
US 2022/0098353 A1    Mar. 31, 2022

(30) Foreign Application Priority Data
Jan. 30, 2019 (EP) ..................... 19154624

(51) Int. Cl.
*C08F 2/38* (2006.01)
*C08F 4/80* (2006.01)
*C08F 293/00* (2006.01)
*C09D 133/04* (2006.01)
*C09D 153/00* (2006.01)
*C09J 133/04* (2006.01)
*C09J 153/00* (2006.01)

(52) U.S. Cl.
CPC ............ *C08F 293/005* (2013.01); *C08F 2/38* (2013.01); *C08F 4/80* (2013.01); *C09D 133/04* (2013.01); *C09D 153/00* (2013.01); *C09J 133/04* (2013.01); *C09J 153/00* (2013.01); *C08F 2438/03* (2013.01)

(58) Field of Classification Search
None
See application file for complete search history.

(56) References Cited

U.S. PATENT DOCUMENTS

| | | | |
|---|---|---|---|
| 6,306,994 B1 | 10/2001 | Donald et al. | |
| 11,459,419 B2 * | 10/2022 | Schellekens | C09D 151/003 |
| 2003/0073779 A1 | 4/2003 | Tamori et al. | |
| 2006/0100305 A1 | 5/2006 | Ma | |
| 2010/0081769 A1 | 4/2010 | Ma | |
| 2011/0021689 A1 * | 1/2011 | Schellekens | C08L 53/00 524/505 |

FOREIGN PATENT DOCUMENTS

| | | |
|---|---|---|
| CN | 101050258 A | 10/2007 |
| CN | 101918465 A | 12/2010 |
| CN | 102027029 A | 4/2011 |
| CN | 102046665 A | 5/2011 |
| CN | 107108815 A | 8/2017 |

OTHER PUBLICATIONS

International Search Report for PCT/EP2020/052149, mailed May 28, 2020, 3 pages.
Written Opinion of the ISA for PCT/EP2020/052149, mailed May 28, 2020, 4 pages.

* cited by examiner

*Primary Examiner* — Richard A Huhn
(74) *Attorney, Agent, or Firm* — The Webb Law Firm

(57) ABSTRACT

The present invention relates to a process for preparing a waterborne dispersion comprising amphiphilic block copolymer comprising at least blocks [A] and [B], and polymer P comprising ethylenically unsaturated monomer(s) different from monomer(s) (i) (monomer(s) (iii)), whereby the amount of block copolymer is higher than 0.5 and lower than 50 wt. %, based on the total weight of monomers used to prepare the block copolymer and polymer P, wherein the process comprises at least the following steps: (I) subjecting at least ethylenically unsaturated monomer(s) (i) bearing acid-functional groups to a free-radical polymerization process in an aqueous medium in the presence of a free radical initiator and a cobalt chelate complex to obtain block [A], (II) subjecting at least ethylenically unsaturated monomer(s) (ii) different from monomer(s) (i) to an emulsion polymerization process in aqueous medium in the presence of block [A] and a free radical initiator, whereby the amount of ethylenically unsaturated monomer(s) (ii) in block [B] is at least 70 wt. %, relative to the total weight amount of monomers used to prepare block [B] and whereby the ethylenically unsaturated monomer(s) (ii) is (are) selected from the group consisting of methacrylic acid esters, dialkyl esters of itaconic acid, methacrylonitrile, α-methyl styrene and any mixture thereof, (III) subjecting at least ethylenically unsaturated monomer(s) (iii) different from monomer(s) (i) to an emulsion polymerization process in aqueous medium at a pH in the range of from 5 to 10 in the presence of the amphiphilic block copolymer to obtain the block copolymer-polymer P, and the process further comprises deactivating the cobalt chelate complex, which remains from step (I), prior to and/or during step (II).

24 Claims, No Drawings

PROCESS FOR PREPARING WATERBORNE DISPERSION

This application is the U.S. national phase of International Application No. PCT/EP2020/052149 filed 29 Jan. 2020, which designated the U.S. and claims priority to EP Patent Application No. 19154624.1 filed 30 Jan. 2019, the entire contents of each of which are hereby incorporated by reference.

The present invention relates to a process for preparing a waterborne dispersion, and to a coating composition comprising the waterborne dispersion. The waterborne dispersion comprises a polymer composition comprising an amphiphilic block copolymer and a polymer P. The amphiphilic block copolymer acts as stabilizer in the polymerization to prepare polymer P and as stabilizer for the waterborne dispersion.

It is known that reversible addition-fragmentation chain transfer (RAFT) polymerization is a very efficient means to control polymer chain composition and architecture. Also, the preparation of amphiphilic block copolymers using RAFT is known. Amphiphilic block copolymers prepared using RAFT are able to provide excellent colloidal stability of waterborne polymer dispersions at very low overall acid (and surfactant) content, which is beneficial for coating barrier properties. For example, WO09090252 describes a process for preparing a water-borne crosslinkable composition comprising a crosslinkable block copolymer comprising at least blocks $[A]_x[B]_y$ and a polymer P, where at least block [A] and [B] is obtained by a controlled radical polymerization of at least one ethylenically unsaturated monomer via a reversible addition-fragmentation chain transfer (RAFT) mechanism in solution in the presence of a control agent and a source of free radicals; where block [A] at least comprises ethylenically unsaturated monomer units bearing water-dispersing functional groups; block [B] comprises ethylenically unsaturated monomer units bearing crosslinking functional groups and ethylenically unsaturated monomer units selected from $C_{1-18}$ alkyl(meth)acrylate monomers and styrenic monomers; where the polymer P is obtained in the presence of the block copolymer by an emulsion polymerization process. WO-A-09121911 describes a process for preparing an aqueous coating composition comprising a block copolymer comprising at least blocks $[A]_x[B]_y$ and a polymer P, where at least block [A] is obtained by a controlled radical polymerization of at least ethylenically unsaturated monomer units bearing water-dispersing functional groups via a reversible addition-fragmentation chain transfer (RAFT) mechanism; block [B] comprises ethylenically unsaturated monomer units bearing plastic adhesion promoting functional groups; where the polymer P is obtained in the presence of the block copolymer by an emulsion polymerization process. In these publications, the amphiphilic block copolymer is prepared using solution polymerization in organic solvents with a low boiling point and/or a high evaporation rate to allow removal of the organic solvent under reduced pressure after the dispersion step of the block copolymer in water. Examples of such solvents include acetone, ethanol, isopropanol, methyl ethyl ketone and ethyl acetate. Removal of these solvents is needed to obtain an acceptable Volatile Organic Compound (VOC) content of the waterborne dispersion. However, the dispersion of the block copolymer in water and the removal of the organic solvent results in extra process steps which is not desired. Furthermore, the reaction time for preparing the block copolymer using RAFT in solution lasts for many hours, while final monomer conversion levels remain rather low (typically around 95%). Another disadvantage of RAFT polymerization is that it relies on the use of sulfur-based control agents that become attached to the polymer chain-end and are highly colored and can cause an unpleasant odor in the final product. It is believed that the unpleasant odor is due to low molecular weight sulfur compounds that are either present as impurities in the RAFT agent and/or generated during or after polymerization from gradual decomposition of the thiocarbonylthio (S-C(Z)=S) moiety for example due to hydrolysis or reaction with strong nucleophiles like ammonia.

The object of the present invention is to provide a process which allows for preparing a waterborne dispersion with reduced color and odor and at the same time retaining desirable coating performance such as water resistance, whereby the process for the synthesis of the block copolymer can be effected as a one-pot procedure in water without having to use organic solvents.

According to the invention there is provided a process for preparing a waterborne dispersion comprising
  (A) amphiphilic block copolymer comprising at least blocks [A] and [B], whereby
    block [A] comprises ethylenically unsaturated monomer(s) bearing acid-functional groups (monomer(s) (i)), and
    block [B] comprises ethylenically unsaturated monomer(s) different from monomer(s) (i) (monomer(s) (ii)); and
  (B) polymer P comprising ethylenically unsaturated monomer(s) different from monomer(s) (i) (monomer(s) (iii)),
whereby the amount of block copolymer is higher than 0.5 and lower than 50 wt. %, based on the total weight of monomers used to prepare the block copolymer and polymer P,
wherein the process comprises at least the following steps:
  (I) subjecting at least ethylenically unsaturated monomer(s) (i) bearing acid-functional groups to a free-radical polymerization process in an aqueous medium in the presence of a free radical initiator and a cobalt chelate complex to obtain block [A],
  (II) subjecting at least ethylenically unsaturated monomer(s) (ii) different from monomer(s) (i) to an emulsion polymerization process in aqueous medium in the presence of block [A] and a free radical initiator, whereby the amount of ethylenically unsaturated monomer(s) (ii) in block [B] is at least 70 wt. %, relative to the total weight amount of monomers used to prepare block [B] and whereby the ethylenically unsaturated monomer(s) (ii) is (are) selected from the group consisting of methacrylic acid esters, dialkyl esters of itaconic acid, methacrylonitrile, α-methyl styrene and any mixture thereof,
  (III) subjecting at least ethylenically unsaturated monomer(s) (iii) different from monomer(s) (i) to an emulsion polymerization process in aqueous medium at a pH in the range of from 5 to 10 in the presence of the amphiphilic block copolymer to obtain the block copolymer-polymer P,
and the process further comprises deactivating the cobalt chelate complex, which remains from step (I), prior to and/or during step (II).

It has surprisingly been found that with the process of the invention amphiphilic block copolymers can be obtained directly in water (i.e. steps (I) and (II) can be performed sequentially as a one-pot procedure in water), while the strong color and unpleasant odor issue during preparation and of the final dispersion can be reduced or even eliminated and at the same time the process of the invention allows for obtaining waterborne dispersions which are able to retain desirable coating performance such as water resistance. An additional advantage of the present invention is that the conversion during the preparation of the amphiphilic block copolymer is increased significantly, even to quantitative yields (>99%), while at the same time the reaction time can be significantly reduced.

WO95/04767 describes a process for making an aqueous polymer emulsion, which process comprises (a) preparing a low molecular weight macromonomer containing acid-functional groups using a free radical polymerization process, and for the purpose of controlling molecular weight, a transition metal chelate complex, (b) conducting an aqueous emulsion polymerization in the presence of the macromonomer. The synthesis of amphiphilic block copolymers via catalytic chain transfer polymerization and use of these block copolymers as stabilizer in emulsion is not described. It has been found that the stabilizing properties of such a macromonomer compared to a block copolymer according to this invention are much lower as macromonomers have no or much lower surface-active properties and do not form micelles like amphiphilic block copolymers. To obtain similar stabilizing properties, the amount of macromonomer has to be increased significantly, resulting in a decrease of the water resistance of the coating.

WO9615157 relates to a process for making block copolymers of narrow polydispersity via a macromonomer (vinyl-terminated compound) where the control of the radical flux is key. Examples 1-9 show the synthesis of methacrylic acid block copolymers by emulsion polymerization, but a methacrylic acid (MAA)—butyl methacrylate (BMA) block copolymer ($MAA_{12}$-block-$BMA_4$) is used as stabilizer (with $NaHCO3$ as buffer). Example 22 furthermore shows the one-pot synthesis of (MMA-co-MAA)-block-BMA (Mn 3090, PDI=1.74; MMA=methyl methacrylate) in water, but also here a MAA-BMA block copolymer is used as stabilizer. A disadvantage of using a MAA-BMA stabilizing block copolymer for preparing the methacrylic acid block copolymers by emulsion polymerization is that the MAA-BMA block copolymer needs to be prepared separately via polymerization in organic solvent from a pre-formed MAA compound (Examples 46 and 47 as disclosed in WO9615157). The advantage of the process according the invention is that the synthesis of the amphiphilic block copolymer does not require the use of a pre-formed block copolymer but can conveniently be performed in a typical emulsion polymerization process where conventional surfactants including most commonly applied anionic surfactants like sodium lauryl sulfate can be used, while maintaining the desired coating performance such as low water sensitivity. Further, there is no disclosure of preparing an additional polymer in the presence of the block copolymer. The absence of preparing an additional polymer in the presence of the block copolymer (i.e. step (III) in the process of the invention) results in very poor water resistance of the dispersion when used in for example a coating composition.

EP1138730 relates to surfactant-free emulsions stabilized by a block or graft copolymer. The block copolymer is an AB block copolymer having a hydrophobic or hydrophilic macromonomer as the A block and a hydrophilic or hydrophobic copolymer as the B block. In the experimental part, the block copolymer is an AB block copolymer having a hydrophilic macromonomer as the A block and a hydrophobic copolymer as the B block and is prepared via 2 polymerization steps, namely the preparation of the hydrophilic (methacrylic acid based) macromonomer via catalytic chain transfer polymerization in solution in isopropanol and methyl ethyl ketone, and then copolymerization of the obtained macromonomer with hydrophobic methacrylate monomers in isopropanol and methyl ethyl ketone using an azo initiator to form an amphiphilic AB block copolymer. The block copolymer is then dispersed in water via aid of a base and then used as stabilizer to prepare a surfactant-free emulsion polymer. The reaction times for each of the blocks are approximately 6 hours under reflux temperature (around 82° C.). The organic solvents isopropanol and methyl ethyl ketone were removed prior to using the block copolymer as stabilizer in a surfactant-free emulsion polymerization step. A disadvantage of the process is that in order to obtain low volatile organic content of the dispersion the volatile organic solvents have to be removed, which is a time-consuming and costly additional process step. In addition, the process for block copolymer synthesis as performed in organic solvents will not result in near quantitative (>99%) monomer conversion. Further, the process does not include a deactivation step of the cobalt chelate catalyst after preparation of the macromonomer. The absence of deactivating the cobalt chelate catalyst after preparation of the macromonomer in the process of EP1138730 may result in that the process does not allow the formation of amphiphilic block copolymers with high block purity resulting in that the stabilizing properties of the block copolymer as obtained following the process as disclosed in EP1138730 is less than with a block copolymer prepared according to the invention. The applicant has found that the absence of the deactivation step will result in a significantly increased particle size of both the neutralized block copolymer in water and the block copolymer stabilized emulsion.

The dispersion prepared with the process according to the invention is waterborne. As used herein, "waterborne" means that the principal solvent or carrier fluid of the continuous phase (not including monomers) in the dispersion of the present invention is preferably at least 70 wt. % water, more preferably at least 80 wt. % and even more preferably at least 85 wt. % water, based on the total weight of the continuous phase. Most preferably, the principal solvent or carrier fluid of the continuous phase (not including monomers) is 100 wt % water.

For all upper and/or lower boundaries of any range given herein, the boundary value is included in the range given. Thus, when saying from x to y, means including x and y.

As used herein, the terms 'block copolymer-polymer composition' and 'block copolymer-polymer' refers to the product formed after the emulsion polymerization of polymer P monomers in the presence of the block copolymer comprising blocks [A] and [B].

The waterborne dispersion of the invention comprises a block copolymer and a polymer P which is different from the block copolymer. The polymerization to prepare polymer P is emulsion polymerization in aqueous medium, preferably in water. A conventional emulsion polymerization process is carried out in water using monomer(s), surfactant(s) and a water-soluble initiator. It is known that surfactants play a critical role in stabilizing the dispersion of polymer particles during formation and in preventing coagulation of the final latex on standing. In the present invention, the block copolymer is amphiphilic and has sufficient amount of ionic-functional groups that allow the block copolymer to act as polymeric surfactant or block copolymer micelle or block copolymer "seed" in the polymerization to prepare polymer P, and to act as stabilizer for the waterborne dispersion. Hence, the preparation of polymer P is effected in the presence of the block copolymer. As used herein, unless otherwise stated, the term "amphiphilic block copolymer" refers to a block copolymer that has at least one block hydrophilic of nature (block [A]) and at least one further block being hydrophobic of nature (block [B]). Hydrophobicity may be determined by the Hansch parameter. The Hansch parameter for block [A] is lower than that for block [B]. As used herein, unless otherwise stated, the term "stabilizer" denotes an amphiphilic compound capable of stabilizing a dispersion from coalescing. Where the stabilizer is acting to stabilize a dispersed liquid organic phase in a continuous waterborne phase the stabilizer may also be referred to as a surfactant.

The block copolymer comprises at least blocks [A] and [B], whereby block [A] comprises ethylenically unsaturated monomer(s) bearing acid-functional groups (monomer(s) (i)), and block [B] comprises ethylenically unsaturated monomer(s) different from monomer(s) (i) (monomer(s) (ii)). The acid-functional groups present in monomers (i) provide block [A] or the block copolymer with a certain degree of water-soluble or water-dispersible character. For example, water soluble means that block [A] and/or the block copolymer is fully soluble in water at a concentration of at least 1 wt. % at 25° C.; for example, water dispersible means that block [A] and/or the block copolymer does not fully dissolve in water at a concentration of at least 1 wt. % at 25° C. but can be dispersed in water at a concentration of at least 1 wt. % at 25° C. The monomer (i) has an acid functional group whose presence assists the dispersion or solubility of at least block [A] in water preferably via (partial) deprotonation of the acid functional groups with an inorganic and/or organic base and enhances the stability of the dispersion.

The block copolymer is preferably a diblock copolymer consisting of blocks [A] and [B].

The amount of the block copolymer is higher than 0.5 wt. % and lower than 50 wt. %, based on the total weight of monomers used to prepare the block copolymer and polymer P. The amount of the block copolymer is preferably from 1 to 30 wt. %, more preferably from 2 to 20 wt. %, even more preferably from 2 to 10 wt. % based on the total weight of monomers used to prepare the block copolymer and polymer P. The advantage of using lower amounts of block copolymer is that the block copolymer-polymer P composition will have a lower concentration of acid monomer, which is beneficial for the barrier properties of the waterborne dispersion according the invention when used in coating applications.

The acid value of the block copolymer-polymer composition is preferably less than 35 mg KOH per g of the block copolymer-polymer P composition. More preferably, the acid value of the block copolymer-polymer composition is less than 25, most preferably less than 20 mg KOH per g of the block copolymer-polymer P composition. The acid value of the composition consisting of the block copolymer and the polymer P is calculated based on the monomers charged in the polymerization processes to prepare the block copolymer and the polymer P, i.e. the acid value of the composition consisting of the block copolymer and the polymer P is calculated according to the formula AV=((total molar amount of acid functional monomers charged in the polymerization processes to prepare the block copolymer and the polymer P per gram of total amount of monomers charged in the polymerization processes to prepare the block copolymer and the polymer P) * 56.1* 1000) and is denoted as mg KOH per gram of the block copolymer-polymer P composition.

As used herein, the weight average molecular weights (Mw) and number average molecular weights (Mn) is determined by using size exclusion chromatography (SEC) according to the method described herein below.

Block [A]

In step (I) of the process of the invention, at least ethylenically unsaturated monomer(s) (i) bearing acid-functional groups are subjected to a free-radical polymerization process, preferably an emulsion polymerization process or a solution polymerization process, in an aqueous medium in the presence of a free radical initiator and a cobalt chelate complex to obtain block [A].

The aqueous medium used in step (I) is water optionally mixed with organic solvent in an amount of at most 25 wt. % relative to the aqueous medium. Preferred organic solvents are cosolvents that do not need to be removed after synthesis and favorably act as coalescing agents during film formation of the waterborne dispersion when applied in coatings, which include glycols and glycol ethers such as for example ethylene glycol, propylene glycol, butyl glycol and dipropylene glycol methyl ether. Preferably, the aqueous medium used in step (I) is water.

To prepare block [A] a cobalt chelate complex is added to the free-radical polymerization process. The cobalt chelate complex is a catalytic chain-transfer agent allowing control over the molecular weight of the macromonomer (block [A]) as well as creating terminal ethylenically unsaturated groups. In catalytic chain-transfer polymerization (CCTP) a free radical polymerization is carried out using a free radical forming initiator and a catalytic amount of a selected transition metal complex acting as a catalytic chain transfer agent, in particular a cobalt chelate complex. The catalytic chain-transfer agent that is used for preparing block [A] is preferably a cobalt chelate complex or a mixture of cobalt chelate complexes.

Although sulfur-based chain transfer agents are to be avoided in view of the color and odor issue as described above, small amounts may be tolerated as long as they do not negatively impact the color and odor of the waterborne dispersions obtained with the process of the invention. Most preferably, sulfur-based chain-transfer agents are not used for preparing block [A] and [B]. In case sulfur based chain-transfer agents are used these are preferably used for preparing polymer P. Sulfur-based chain transfer agents includes mercaptans.

The cobalt chelate complex used in the invention process preferably comprises $BF_2$ bridging groups. More preferably, the cobalt chelate complex is a cobalt II chelate having the following formula:

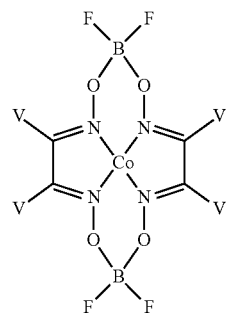

where V can be varied to tailor solubility and activity of the catalyst complex and can be an alkyl, a phenyl or an alkyl-substituted phenyl group. Preferably V is an alkyl group, more preferably a methyl (CH₃) group.

Preferred cobalt chelate complex is bis[(difluoroboryl)dimethylglyoximato]cobalt(II) and/or bis[(difluoroboryl)diethylglyoximato]cobalt(II), most preferred cobalt chelate complex is bis[(difluoroboryl)dimethylglyoximato]cobalt(II).

The concentration of cobalt chelate complex used for preparing the macromonomer (block [A]) is preferably in the range of from 1 to 500 parts per million (ppm), more preferably in the range of from 5 to 200 ppm, most preferably in the range of from 10 to 150 ppm, calculated as molar amount of cobalt complex based on total molar amount of monomers in block [A].

The preferred process (step (I)) for preparing block [A] is a free-radical-initiated emulsion polymerization in water of at least monomer (i), which process employs a Co chelate complex as a catalytic chain transfer agent, a free radical initiator and preferably a stabilizing substance for the emulsion polymerization process. Suitable stabilizers include but are not limited to conventional anionic, cationic and/or non-ionic surfactants and mixtures thereof such as Na, K and NH₄ salts of dialkylsulfosuccinates, Na, K and NH₄ salts of alkyl sulphonic acids, Na, K and NH₄ alkyl sulphates, ethoxylated fatty acids and/or fatty amides, and Na, K and NH₄ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups or carboxylic acid groups. Cationic surfactants include alkyl or (alk)aryl groups linked to quaternary ammonium salt groups. Non-ionic surfactants include polyglycol ether compounds and preferably polyethylene oxide compounds as disclosed in "Nonionic surfactants—Physical chemistry" edited by M. J. Schick, M. Decker 1987. Preferred stabilizers are anionic surfactants, preferably sulfate or sulfonate surfactants. Most preferred stabilizer is sodium lauryl sulfate. The amount of surfactant, relative to total monomers used to prepare the macromonomer (block [A]) in an emulsion polymerization process, is preferably from 0.1 to 3 wt. %, more preferably from 0.2 to 2 wt. %, even more preferably from 0.2 to 1 wt. %.

The amount of surfactant (in case step (I) is effected in the absence of surfactant) or the amount of additional surfactant (in case step (I) is effected in the presence of surfactant) relative to total monomers used to prepare block [B] is preferably in the range of from 0 to 1 wt %, more preferably 0 to 0.5 wt %, even more preferably 0 to 0.3 wt % and most preferably no (additional) surfactant is used. The amount of (additional) surfactant relative to total monomers used to prepare polymer P is preferably in the range of from 0 to 2 wt %, more preferably 0 to 1 wt %, even more preferably 0 to 0.5 wt % and most preferably no (additional) surfactant is used.

Preferably, step (I) and/or step (II) are/is effected in the absence of a methacrylic acid-block-butyl methacrylate, more preferably in the absence of a block copolymer. More preferably, step (I) and step (II) are effected in the absence of a methacrylic acid-block-butyl methacrylate, more preferably in the absence of a block copolymer.

The free radical initiator used in step (I) preferably comprises, more preferably is, an azo compound. Preferably the azo compound is 2,2'-azobis (isobutyronitrile), 2,2'-azodi(2-methylbutyronitrile), 4,4'-azobis(4-cyanovaleric acid), 2,2'-azobis [2-methyl-N-(1,1-bis(hydroxymethyl)-2-(hydroxyethyl)]-propionamide, 2,2'-azobis[2-methyl-N-(2-hydroxyethyl)]-propionamide and/or 2,2'-azobis(N,N'-dimethyleneisobutyramidine) dihydrochloride. More preferably the azo compound is water soluble, most preferred water soluble azo compound is 4,4'-azobis(4-cyanovaleric acid). The amount of initiator to use is conventional and typically chosen such that the radical flux at the polymerization temperature is sufficiently high to obtain acceptable monomer conversion rates. A further amount of initiator may optionally be added at the end of the polymerization process to assist the removal of any residual ethylenically unsaturated monomers.

It is well known to those skilled in the art that cobalt chelate complexes are sensitive to oxidation and hydrolysis, especially acid hydrolysis. In case the cobalt chelate complex is (partially) deactivated during step (I) the macromonomer formation will be less effective and more catalyst is required to obtain the desired macromonomer at the targeted molecular weight and vinyl-terminated functionality, which is not desired from a cost perspective. In order to ensure the catalytic activity of the cobalt chelate complex remains sufficiently high during step (I) the polymerization is preferably conducted under inert conditions, which means that the oxygen concentration in the reaction mixture, optionally including the monomer mixture, is reduced via purging with nitrogen gas and/or via inerting the gas phase inside the reaction vessel with vacuum swings from air to vacuum to nitrogen. The oxygen concentration in the gas phase above the reaction mixture is preferably reduced to less than 4 volume %. The reaction temperature applied during step (I) is preferably in the range of from 30 to 80° C., more preferably in the range of from 50 to 75° C. to reduce or avoid partial deactivation of the cobalt catalyst. Exposure of the cobalt complex in the reaction mixture to obtain near quantitative monomer conversion at the desired reaction temperature is preferably limited to 4 hours, more preferably less than 3 hours. In addition, the cobalt catalyst is preferably fed to the reaction mixture in parallel to the monomer feed mixture or preferably as dissolved in the monomer feed mixture to ensure the catalyst activity remains sufficiently high during step (I). It may furthermore be desired to feed the catalyst separately from the acid monomer applied in step (I) to prevent deactivation of the catalyst from hydrolysis under acidic conditions.

Block [A] preferably further comprises ethylenically unsaturated monomer(s) not bearing acid-functional groups (monomer(s) (iv)).

Monomer(s) (i): Ethylenically Unsaturated Monomer(s) Bearing Acid-Functional Groups The acid-functional groups are preferably carboxylic acid groups. The ethylenically unsaturated monomer(s) bearing acid-functional groups (monomer(s) (i)) are preferably selected from the group consisting of acrylic acid, methacrylic acid, itaconic acid, monoalkyl itaconic acid (preferably monomethyl itaconic acid, monoethyl itaconic acid and/or monobutyl itaconic acid) and any mixture thereof. More preferably, at least 50 wt. % of the ethylenically unsaturated monomer(s) bearing acid-functional groups (monomer(s) (i)) is methacrylic acid. Even more preferably, at least 80 wt. % of the ethylenically unsaturated monomer(s) bearing acid-functional groups (monomer(s) (i)) is methacrylic acid. Most preferably the ethylenically unsaturated monomer(s) bearing acid-functional groups (monomer(s) (i)) is methacrylic acid.

Monomer(s) (iv): Ethylenically Unsaturated Monomer(s) Not Bearing Acid-Functional Groups Block [A] preferably further comprises ethylenically unsaturated monomer(s) not bearing acid-functional groups (monomer(s) (iv)). The monomer system used in step (I)

then comprises ethylenically unsaturated monomer(s) bearing acid-functional groups (monomer(s) (i)) and ethylenically unsaturated monomer(s) not bearing acid-functional groups (monomer(s) (iv)), resulting in block [A] comprising monomer(s) (i) and (iv). The monomer system used in step (I) may optionally further comprise monomers (iii), different than monomer(s) (i) and monomer(s) (iv), in an amount of preferably at most 20 wt. %, relative to the summed amount on monomers used to prepare block [A]. Most preferably, the monomer system used in step (I) consists of monomers (i) and monomers (iv).

The ethylenically unsaturated monomer(s) (iv) are preferably selected from the group consisting of methacrylic acid esters, dialkyl esters of itaconic acid (preferably dimethyl itaconate, diethyl itaconate and/or dibutyl itaconate), methacrylonitrile, α-methyl styrene and any mixture thereof. More preferably the ethylenically unsaturated monomer(s) (iv) are selected from the group consisting of methacrylic acid esters. The methacrylic acid esters (iv) are preferably selected from methyl methacrylate, ethyl methacrylate, n-propyl methacrylate, i-propyl methacrylate, n-butyl methacrylate, i-butyl methacrylate, t-butyl methacrylate, 2-hydroxyethyl methacrylate, hydroxypropyl methacrylate, ethyltriglycol methacrylate, butyldiglycol methacrylate and poly(ethylene glycol) methacrylate. More preferably the ethylenically unsaturated monomer(s) (iv) are selected from the group consisting of methyl methacrylate, ethyl methacrylate and any mixture thereof. Most preferably, the ethylenically unsaturated monomer (iv) is methyl methacrylate.

The monomer system used in step (I) preferably comprises 5-100 wt. % of monomers (i) and 95-0 wt. % of monomers (iv), whereby the amounts of monomer(s) (i) and (iv) are given relative to the summed amount of monomers (i) and (iv). More preferably the monomer system used in step (I) comprises 5-70 wt. % of monomers (i) and 95-30 wt. % of monomers (iv), even more preferably the monomer system used in step (I) comprises 10-50 wt. % of monomers (i) and 90-50 wt. % of monomers (iv), most preferably the monomer system used in step (I) comprises 15-55 wt. % of monomers (i) and 85-45 wt. % of monomers (iv), whereby the amounts of monomer(s) (i) and (iv) are given relative to the summed amount of monomers (i) and (iv). Preferably the amounts of monomer(s) (i) and (iv) as given are relative to the summed amount of monomers used to prepare block [A], i.e. the monomer system used to prepare block [A] consists of monomers (i) and monomers (iv).

Preferably, at least 90 wt. %, more preferably at least 95 wt. % and even more preferably 100 wt. % of the total amount of monomers (i) present in the block copolymer-polymer composition is present in block [A].

The total weight of monomers in block [A] based on the total weight of monomers in the block copolymer is preferably in the range of from 5 to 90 wt. %, more preferably in the range from 10 to 80 wt. %, even more preferably from 15 to 70 wt. %, and most preferably from 20 to 65 wt. %.

The weight average molecular weight of block [A] of the block copolymer is preferably in the range of from 500 to 20,000 g/mol, more preferably from 1,000 to 15,000 g/mol and even more preferably from 1,500 to 10,000 g/mol.

In the process of the invention, the cobalt chelate complex which remains from step (I) (i.e. the cobalt chelate complex that is still present in the composition obtained in step (I)) is deactivated prior to and/or during step (II)). It is believed that omitting the step of deactivating the cobalt chelate complex which remains from step (I) results in the formation of vinyl-terminated polymers from the monomers applied in step (II) and reduced the degree of block copolymer formation, and hence negatively affects the colloidal stability of the dispersion induced by the presence of the block copolymer.

The deactivating of the cobalt chelate complex that is still present after step (I) can be effected by adding oxidant, such as for example hydrogen peroxide, to the composition obtained in step (I) but prior to step (II), and/or effecting step (II) in the presence of a free radical initiator able to form an oxygen-centered radical, preferably selected from the group consisting of peroxides, persulfates and mixtures thereof. Typical examples of peroxides may include hydrogen peroxide, t-butyl hydroperoxide, cumyl hydrogen peroxide, and the like. Preferred persulfates are ammonium persulfate, potassium persulfate and sodium persulfate. Increasing the reaction temperature to at least 80° C. or more preferably at least 85° C. after step (I) for a sufficiently long reaction time, but prior to and/or during step (II) can also result in deactivation of the cobalt chelate complex.

Preferably, the deactivating of the cobalt chelate complex which remains from step (I) is effected by increasing the temperature to at least 80° C. after step (I) and prior to step (II) and by effecting step (II) in the presence of a persulfate and/or peroxide as free radical initiator. More preferably, the deactivating of the cobalt chelate complex which remains from step (I) is effected by increasing the temperature to at least 85° C. after step (I) and prior to step (II) and by effecting step (II) in the presence of a persulfate as free radical initiator.

Block FBI
Monomer(s) (ii) : Ethylenically Unsaturated Monomer(s)
Monomer(s) (ii)

In step (II) of the process of the invention, at least ethylenically unsaturated monomer(s) (ii) different from monomer(s) (i) are subjected to an emulsion polymerization process in aqueous medium, preferably in water, in the presence of block [A] and a free radical initiator to obtain an aqueous solution or an aqueous dispersion, preferably an aqueous dispersion, of the amphiphilic block copolymer, whereby the ethylenically unsaturated monomer(s) (ii) is (are) selected from the group consisting of methacrylic acid esters, dialkyl esters of itaconic acid (preferably dimethyl itaconate, diethyl itaconate and/or dibutyl itaconate), methacrylonitrile, α-methyl styrene and any mixture thereof. Preferably, the ethylenically unsaturated monomer(s) (ii) is (are) selected from the group consisting of methacrylic acid esters. The methacrylic acid esters (ii) are preferably selected from the group consisting of methyl methacrylate, ethyl methacrylate, propyl methacrylate (all isomers), butyl methacrylate (all isomers), 2-ethylhexyl methacrylate, isodecyl methacrylate, isobornyl methacrylate, benzyl methacrylate, phenyl methacrylate, cyclohexyl methacrylate, lauryl methacrylate, stearyl methacrylate and any mixture thereof. More preferably, the methacrylic acid esters are selected from the group consisting of methyl methacrylate, ethyl methacrylate, n-butyl methacrylate, t-butyl methacrylate, 2-ethylhexyl methacrylate, isobornyl methacrylate, benzyl methacrylate, cyclohexyl methacrylate and any mixture thereof. Most preferably, the ethylenically unsaturated monomer(s) (ii) is (are) selected from the group consisting of methyl methacrylate, ethyl methacrylate, n-butyl methacrylate, 2-ethylhexyl methacrylate, cyclohexyl methacrylate and any mixture thereof.

Block [B] preferably comprises ethylenically unsaturated monomer(s) (ii) in an amount of at least 75 wt. %, more preferably at least 80 wt. %, even more preferably at least 85 wt. %, even more preferably at least 90 wt. %, even more preferably at least 95 wt. % and most preferably 100 wt. %, relative to the total weight amount of monomers used to prepare block [B].

Block [B] may optionally further comprise monomers (iii) and/or monomers (v) different than monomer(s) (ii) in an amount of preferably lower than 25 wt. %, more preferably lower than 20 wt. %, even more preferably lower than 15 wt. %, even more preferably lower than 10 wt. %, even more preferably lower than 5 wt. % and most preferably 0 wt. %, relative to the summed amount on monomers used to prepare block [B]. The monomers (iii) when present in block [B] are preferably selected from the group of $C_{1-12}$ alkyl acrylate monomers, preferably including methyl acrylate, ethyl acrylate, propyl acrylate (all isomers), butyl acrylate (all isomers), 2-ethylhexyl acrylate, isobornyl acrylate, cyclohexyl acrylate and any mixture thereof, more preferably monomers (iii) when present in block [B] are selected from butyl acrylate and/or 2-ethylhexyl acrylate. The monomers (v) which may optionally be used to prepare block [B] are preferably selected from the group consisting of diacetone acrylamide, hydroxyalkyl (meth)acrylates such as hydroxyethyl (meth)acrylate, 2-hydroxypropyl (meth)acrylate and/or 4-hydroxybutyl (meth)acrylate and any mixture thereof.

The aqueous medium used in step (II) is water optionally mixed with organic solvent in an amount of at most 25 wt. % relative to the aqueous medium. Preferred organic solvents are cosolvents that do not need to be removed after synthesis and favorably act as coalescing agents during film formation of the waterborne dispersion when applied in coatings, which include glycols and glycol ethers such as for example ethylene glycol, propylene glycol, butyl glycol and dipropylene glycol methyl ether. Preferably, the aqueous medium used in step (II) is water.

The free radical initiator used in step (II) preferably comprises, more preferably is, a free radical initiator able to form an oxygen-centered radical, preferably selected from the group consisting of peroxides, persulfates and mixtures thereof. Typical examples of peroxides may include hydrogen peroxide, t-butyl hydroperoxide, cumyl hydrogen peroxide, and the like. Preferred persulfates are ammonium persulfate, potassium persulfate and sodium persulfate. Most preferably the free radical initiator used in step (II) is ammonium persulfate.

The preparation of block [B] is effected in the presence of block [A], preferably in the presence of block [A] prepared in step (I). Preferably, steps (I) and (II) are performed sequentially as a one-pot procedure (i.e. in the same reaction vessel).

The polydispersity of the block copolymer composition obtained in step (II) is preferably <2.5, more preferably <2.0, more preferably <1.7 and most preferably <1.5.

The summed amount of methacrylic acid, itaconic acid, methacrylic acid esters (preferably the summed amount of methyl methacrylate, ethyl methacrylate, n-propyl methacrylate, i-propyl methacrylate, n-butyl methacrylate, i-butyl methacrylate, t-butyl methacrylate, 2-hydroxyethyl methacrylate, hydroxypropyl methacrylate, ethyltriglycol methacrylate, butyldiglycol methacrylate, poly(ethylene glycol) methacrylate, 2-ethylhexyl methacrylate, isodecyl methacrylate, isobornyl methacrylate, benzyl methacrylate, phenyl methacrylate, cyclohexyl methacrylate, lauryl methacrylate and stearyl methacrylate), dialkyl esters of itaconic acid (preferably the summed amount of dimethyl itaconate, diethyl itaconate and dibutyl itaconate), methacrylonitrile and α-methyl styrene in the block copolymer is preferably at least 50 wt. %, more preferably at least 75 wt. %, even more preferably at least 90 wt. %, even more preferably at least 95 wt. %, based on the total weight of monomers used to prepare the block copolymer. More preferably, the summed amount of methacrylic acid and methacrylic acid esters (preferably the summed amount of methyl methacrylate, ethyl methacrylate, n-propyl methacrylate, i-propyl methacrylate, n-butyl methacrylate, i-butyl methacrylate, t-butyl methacrylate, 2-hydroxyethyl methacrylate, hydroxypropyl methacrylate, ethyltriglycol methacrylate, butyldiglycol methacrylate, poly(ethylene glycol) methacrylate, 2-ethylhexyl methacrylate, isodecyl methacrylate, isobornyl methacrylate, benzyl methacrylate, phenyl methacrylate, cyclohexyl methacrylate, lauryl methacrylate and stearyl methacrylate) in the block copolymer is at least 50 wt. %, even more preferably at least 75 wt. %, even more preferably at least 90 wt. %, even more preferably at least 95 wt. % based on the total weight of monomers used to prepare the block copolymer.

In an embodiment of the invention, the summed amount of ethylenically unsaturated monomers comprising the acryloyl group $H_2C=CH-C(=O)-(prop-2-enoyl)$ and the styrenic group $H_2C=CH-(R=aromatic)$ in the block copolymer is at most 50 wt. %, more preferably at most 30 wt. %, even more preferred at most 20 wt. %, and especially preferred at most 10 wt. % based on the total weight of monomers used to prepare the block copolymer.

The weight average molecular weight of the block copolymer is preferably in the range of from 1,000 to 100,000 g/mol, more preferably from 2,000 to 50,000 g/mol and even more preferably from 3,500 to 35,000 g/mol.

The process according to the invention preferably further comprises neutralizing at least a part of the acid-functional groups present in block [A] before, during and/or after step (II) and/or at the start of step (III) to obtain the pH in the range of from 5 to 10, preferably from 6 to 9 and most preferably form 7 to 9 in step (III). More preferably the neutralization of at least part of the acid-functional groups present in block [A] is effected after step (II) and prior to step (III).

Such neutralizing is preferably effected by addition of a suitable organic or inorganic base such as for example ammonia, triethylamine, sodium hydroxide and/or potassium hydroxide. Preferred bases are volatile amines, such as ammonia.

Polymer P

The waterborne dispersion of the invention comprises a block copolymer and a polymer P which is different from the block copolymer. In step (III) of the process of the invention, at least ethylenically unsaturated monomer(s) (iii) different from monomer(s) (i) are subjected to an emulsion polymerization process in aqueous medium at a pH in the range of from 5 to 10, preferably from 6 to 9 and most preferably from 7 to 9 in the presence of the amphiphilic block copolymer to obtain the block copolymer-polymer P.

The aqueous medium used in step (III) is water optionally mixed with organic solvent in an amount of at most 25 wt. % relative to the aqueous medium. Preferred organic solvents are cosolvents that do not need to be removed after synthesis and favorably act as coalescing agents during film formation of the waterborne dispersion when applied in coatings, which include glycols and glycol ethers such as for example ethylene glycol, propylene glycol, butyl glycol and dipropylene glycol methyl ether. Preferably, the aqueous medium used in step (III) is water.

Polymer P is preferably more hydrophobic than the block copolymer.

Preferably block [B] and polymer P are more hydrophobic than block [A]. The hydrophobicity of a polymer may be determined by the Hansch parameter. The Hansch parameter for a polymer is calculated using a group contribution method. The monomer units forming a polymer are assigned a hydrophobicity contribution and the hydrophobicity of the polymer, the Hansch parameter, is calculated based on the weight average of the monomers in the polymer as disclosed in for example C. Hansch, P. Maloney, T. Fujita, and R. Muir, Nature, 194. 178-180 (1962). Values of the hydrophobicity contributions for several monomers are for example: styrene 4.29, α-methylstyrene 4.7, methyl methacrylate 1.89, butyl acrylate 3.19, butyl methacrylate 3.51, acrylic acid -2.52, and methacrylic acid -2.2. Therefore a polymer made up of STY (20) αMS (20) MMA (20) BA (10) AA (30) has a Hansch parameter value of 1.74

Preferably the Hansch parameter for block [A] is lower than that for block [B] and lower than that for polymer P.

Preferably block [A] has a Hansch parameter <1.5, more preferably ≤1.2, more preferably ≤1.0, more preferably ≤0.8, more preferably ≤0.6 and even more preferably ≤−1.0.

Preferably block [B] has a Hansch parameter ≥1.5, more preferably ≥1.7, more preferably ≥2.0 and especially ≥2.2.

Preferably polymer P has a Hansch parameter >1.5, more preferably ≥2.2 and especially ≥2.5.

Depending on the type of polymer P monomers used the resulting block copolymer and polymer P composition will comprise block copolymers and/or graft- or comb-like copolymers. Formation of block copolymer structures are favored when polymer P monomers are mostly methacrylate-based whereas graft- or comb-like copolymer structures will be formed when polymer P monomers comprises acrylate or styrene monomers. Preferably, the polymer P monomers will contain both (a) methacrylate monomers and (b) acrylate and/or styrene monomers.

Preferably steps (I), (II) and (III) are performed sequentially as a one-pot procedure (i.e. in the same reaction vessel).

The weight average molecular weight of the dispersion according to the invention (thus after preparation of polymer P in the presence of the block copolymer (III)) is preferably higher than 50 kg/mol, more preferably higher than 100 kg/mol and even more preferably higher than 150 kg/mol. Preferably, the polydispersity (=Mw/Mn) of the block copolymer-polymer composition is higher than 2, more preferably higher than 5, most preferably higher than 10.

Monomer(s) (iii) : Ethylenically Unsaturated Monomer(s) (iii)

The ethylenically unsaturated monomer(s) (iii) are preferably selected from the group consisting of (meth)acrylic acid ester monomers, (meth)acrylamide monomers, styrenic monomers and any mixture thereof. Suitable styrenic monomers include: styrene, α-methyl styrene, t-butyl styrene, chloromethyl styrene, vinyl toluene. More preferably, the ethylenically unsaturated monomer(s) (iii) are selected from the group consisting of $C_{1-18}$ alkyl(meth)acrylate monomers, styrene, and any mixture thereof. Even more preferably, the ethylenically unsaturated monomer(s) (iii) are selected from the group consisting of $C_{1-12}$ alkyl(meth)acrylate monomers, styrene, and any mixture thereof. The group of $C_{1-12}$ alkyl (meth)acrylate monomers preferably includes methyl (meth)acrylate, ethyl (meth)acrylate, propyl (meth)acrylate (all isomers), butyl (meth)acrylate (all isomers), 2-ethylhexyl (meth)acrylate, isobornyl (meth)acrylate, cyclohexyl (meth)acrylate and any mixture thereof.

Polymer P preferably comprises ethylenically unsaturated monomer(s) (iii) in an amount of at least 80 wt. %, based on the total weight of monomers used to prepare polymer P. Polymer P may further comprise ethylenically unsaturated monomers different from monomers (iii) (monomers (v)) in an amount of less than 20 wt. % (based on the total weight of monomers used to prepare polymer P). Ethylenically unsaturated monomer(s) (v) may include ethylenically unsaturated monomer units bearing crosslinking functional groups and/or other ethylenically unsaturated monomer units such as diene monomers preferably $C_{2-18}$ diene monomers such as 1,3-butadiene and isoprene; divinyl benzene; vinyl monomers preferably $C_{2-18}$ vinyl monomers such as acrylonitrile, methacrylonitrile; vinyl halides preferably $C_{2-18}$ vinyl halides such as vinyl chloride; vinylidene halides preferably $C_{2-18}$ vinylidene halides such as vinylidene chloride; vinyl esters preferably $C_{2-18}$ vinyl esters such as vinyl acetate, vinyl propionate, vinyl laurate; vinyl esters of versatic acid such as VEOVA™ 9 and VEOVA™ 10 (VEOVA™ is a trademark of Resolution); heterocyclic vinyl compounds preferably $C_{3-18}$ vinyl heterocycles; alkyl esters of mono-olefinically unsaturated dicarboxylic acids, preferably $C_{1-18}$ alkyl esters such as di-n-butyl maleate and di-n-butyl fumarate. Examples of monomer units bearing crosslinking functional groups include acetoacetoxyethyl methacrylate, methylvinylketone, diacetone acrylamide, (meth)acroleine, maleic anhydride, glycidyl (meth)acrylate, alkoxysilane monomers such as gammα-methacryloxypropyl trimethoxysilane, hydroxyalkyl (meth)acrylates such as 2-hydroxyethyl (meth)acrylate, 2-hydroxypropyl (meth) acrylate, 4-hydroxybutyl (meth)acrylate, allyl methacrylate, 1,6-hexanediol diacrylate, ethylene diglycol (meth)acrylate, divinyl benzene and/or mixtures thereof. Preferably the ethylenically unsaturated monomer units bearing crosslinking functional groups are selected from the group of diacetone acrylamide and hydroxyalkyl (meth)acrylates.

Polymer P more preferably comprises ethylenically unsaturated monomer(s) (iii) in an amount of at least 85 wt. %, even more preferably in an amount of at least 90 wt. %, even more preferably in an amount of at least 95 wt. % and most preferably in an amount of 100 wt. %, based on the total weight of monomers used to preparer polymer P.

Preferably the solids content of the waterborne dispersion according to the invention is ≥20 wt %, more preferably ≥30 wt % and most preferably ≤65 wt %.

The present invention further relates to a polymeric composition obtained and/or obtainable by the process claimed as described above.

The block copolymer-polymer obtained by the process of the invention is particularly suitable for use in adhesive, coating, paint or ink applications in which it may provide a key part of the total binder system used in the adhesive, coating, paint or ink composition or formulation. The present invention therefore further relates to an adhesive, coating, paint or ink composition comprising the block copolymer-polymer prepared according to the process as described above, or the polymeric composition obtained and/or obtainable by the process claimed as described above. The adhesive, coating, paint or ink composition preferably comprises at least 50 wt. %, more preferably at least 70 wt. %, even more preferably at least 85 wt. % and most preferably at least 90 wt. % of the block copolymer-polymer prepared according to the process as described above, or of the polymeric composition obtained and/or obtainable by the process claimed as described above, whereby the amount is given relative to the total amount of binder present in the adhesive, coating, paint or ink composition. The binder present in the adhesive, coating, paint or ink composition of the invention most preferably consists of the block copolymer-polymer prepared according to the process as described above, or of the polymeric composition obtained and/or obtainable by the process claimed as described above.

The block copolymer-polymer obtained by the process of the invention is more particularly suitable for use in coating applications in which it may provide a key part of coating compositions or formulations. The present invention therefore further relates to a coating composition comprising the block copolymer-polymer prepared according to the process as described above, or the polymeric composition obtained and/or obtainable by the process claimed as described above. The coating composition preferably comprises at least 50 wt. %, more preferably at least 70 wt. %, even more preferably at least 85 wt. % and most preferably at least 90 wt. % of the block copolymer-polymer prepared according to the process as described above, or of the polymeric composition obtained and/or obtainable by the process claimed as described above, whereby the amount is given relative to the total amount of binder present in the coating composition. The binder present in the coating composition of the invention most preferably consists of the block copolymer-polymer prepared according to the process as described above, or of the polymeric composition obtained and/or obtainable by the process claimed as described above.

In an embodiment of the invention there is provided a use to coat a substrate with the waterborne dispersion of the invention where the substrate is selected from the group consisting of wood, board, metals, stone, concrete, glass, cloth, leather, paper, carton, plastics, foam, fibrous materials (including hair and textiles) and combinations thereof. Compositions of the invention may be applied to a suitable substrate by any conventional method including brushing, dipping, flow coating, spraying, as well as flexo printing, gravure printing or any other method conventionally used in graphic arts or similar end uses. The aqueous carrier medium is removed by natural drying or accelerated drying (by applying heat) to form a coating.

The present invention further relates to an article having a coating deposited thereon, wherein the coating is obtained by depositing a coating composition as described above to a substrate and drying the coating composition.

EXAMPLES

The present invention will now be described in detail with reference to the following non limiting examples which are by way of illustration only. Unless otherwise specified, all parts, percentages and ratios are on a weight basis. In the examples, the following abbreviations and terms are specified:

| | | |
|---|---|---|
| MAA | = | methacrylic acid |
| MMA | = | methyl methacrylate |
| BMA | = | butyl methacrylate |
| BA | = | butyl acrylate |
| ACVA | = | 4,4-azobis(4-cyanovaleric acid) |
| AMBN | = | 2,2-azobis(2-methylbutyronitrile) |
| MEK | = | methyl ethyl ketone |
| SLS | = | sodium lauryl sulfate (surfactant) |
| KPS | = | potassium persulfate |
| APS | = | ammonium persulfate |
| CoBF | = | bis[(difluoroboryl)dimethylglyoximato]cobalt(II) |

All number- and weight average molecular weights (Mn and Mw) and polydispersity index PDI (=Mw/Mn) data are determined by SEC analysis. The SEC analyses is performed on an Alliance Separation Module (Waters e2695), including a pump, autoinjector, degasser, and column oven. The eluent is tetrahydrofuran with the addition of 1.0 vol % acetic acid and 5.0 vol % deionized water. The injection volume is 150μL. The flow is established at 1.0 mL/min. Three PL Mixed C (Agilent) columns with a guard column (3μm PL) are applied at a temperature of 50° C. The detection is performed with a differential refractive index detector (Waters 2414). The sample solutions are prepared at a concentration of 5 mg @100% solids) in 1.0 mL THF (+1 vol % acetic acid and 5 vol % deionized water), and the samples are dissolved for a period of at least 1 hr to 24 hrs. All samples are filtered through a 0.45-micron PTFE filter (25mm) before injection. Calibration is performed with polystyrene standards (Agilent EasiVials PL2010-300/303), ranging from 162 to 364,000 gram/mol. Calculation is performed with Empower (Waters) software with a third order calibration curve. The obtained molar masses are polystyrene equivalent molar masses (gram/mol).

The viscosity is measured on a Brookfield viscometer (DV-I™ Viscometer from Brookfield Engineering) using the appropriate spindle at 60 rpm.

The particle size is measured by Dynamic Light Scattering (DLS) using a Malvern Zetasizer S-90.

An overview of the Examples (EX) and the Comparative Examples (CE) is given in Table 1, where oligomer wt % is the amount of solid oligomer based on total solid amount of oligomer and polymer. % refers to weight %, relative to the total weight of monomers used to prepare the oligomer and polymer.

TABLE 1

| Exp | Oligomer | Oligomer wt % | Polymer |
|---|---|---|---|
| EX1 | 1 = MAA/MMA-BMA | 5 | MMA/BA + 0.5% SLS |
| EX2 | 1 = MAA/MMA-BMA | 5 | MMA/BA (surfactant free) |
| CE1 | 2 = MAA/MMA-MA (RAFT) | 5 | MMA/BA + 0.5% SLS |
| CE2 | None | 0 | MMA/BA/MAA/BMA + 0.5% SLS |
| CE3 | 1 = MAA/MMA-BMA | 100 | None |
| CE4 | 2 = MAA/MMA-BMA (RAFT) | 100 | None |
| CE5 | 3 = oligomer 1 without deactivation of the cobalt catalyst | 5 | MMA/BA + 0.5% SLS |
| CE6 | 4 = MMA/MAA (70/30 w/w) macromonomer (LMP1 in WO95/04767) | 5 | MMA/BA + 0.5% SLS |
| CE7 | 4 = MMA/MAA (70/30 w/w) macromonomer (LMP1 in WO95/04767) | 37.5 | MMA/BA + 0.5% SLS |

Oligomer 1

One-pot synthesis of a [A]-[B] diblock copolymer in water, where block [A] is based on MAA and MMA, and block [B] is based on BMA:

181 gram deionized water, 1.0 gram (3.6 mmol) ACVA and 1.3 gram SLS (30 wt % in water) were added to a 0.5 L flask equipped with condenser cooler, temperature measuring probe and mechanical stirring device. The reaction mixture was degassed by purging with nitrogen at ambient temperature for 20 minutes while stirring. The temperature of the reactor phase was then raised to 70° C. while stirring under nitrogen atmosphere. At 70° C. a mixture of 26.3 gram (0.31 mol) MAA, 50.9 gram (0.51 mol) MMA and 12.5 mg CoBF (0.033 mmol) was fed to the reactor phase over a period of 60 minutes. Prior to start of the feed the feed mixture was purged with nitrogen for 40 minutes. At the end of the feed the feed tank was rinsed with approximately 20 gram deionized water and the reaction mixture was then kept for 60 minutes at 70° C. A sample was taken for further analysis. The conversion of MAA and MMA as determined with liquid and gas chromatography was 97.5% and 99.9%.

For preparing the diblock copolymer, the reaction mixture was heated to 80° C. and maintained at 80° C. for 60 minutes while stirring. A sample was taken to determine the monomer conversion and for SEC analysis. The conversion of MAA and MMA as determined with liquid and gas chromatography was 99.7% and >99.9%, respectively. SEC analysis resulted in the following values: Mw=2755 g/mol, PDI=1.94. Then a monomer feed of 61.1 gram (0.43 mol) BMA and an initiator feed mixture of 0.31 gram KPS (1.1 mmol) and 61.1 gram deionized water were added to the reactor in parallel feeds over a period of 3 hours. Both feeds were purged with nitrogen for 30 minutes prior to start of the feed. At the end of the feed the feed tanks were rinsed with approximately 35 gram deionized water and the reaction mixture was kept for 10 minutes at 80° C. and then cooled to ambient temperature. The conversion of BMA as determined with gas chromatography was >99.9% and the solids level was determined at 31.9%. SEC analysis of oligomer 1 resulted in the following values: Mw=5670 g/mol, PDI=1.73.

Oligomer 2

Synthesis of a [A]-[B] diblock copolymer via RAFT polymerization in organic solvent, where block [A] is based on MAA and MMA, and block [B] is based on BMA:

276 gram MEK and 36.4 gram (90 mmol) RAFT agent were added to a 2L flask equipped with condenser cooler, temperature measuring probe and mechanical stirring device. 4-cyano-4-(((dodecylthio)carbonothioyl)thio)pentanoic acid (BM1432, available from Boron Molecular) was applied as RAFT agent. The reaction mixture was degassed by purging with nitrogen at ambient temperature for 20 minutes while stirring. The temperature was then raised to 75° C. and 20% of a monomer feed mixture of 86.8 gram (1.01 mol) MAA, 168.1 gram (1.68 mol) MMA and 91 gram MEK was added to the reaction mixture. Then at 75° C. 50% of an initiator mixture of 1.6 gram AMBN and 64 gram MEK was added. The reaction mixture was then heated to 80° C. followed by the gradual addition of the remaining 80% of the monomer feed mixture over 4 hours. After completion of the feed, the feed tank was rinsed with 10 gram MEK and the reaction mixture was kept for 8 hours at 80° C. The remaining initiator mixture was added to the reactor in two equally divided shots at the end of the feed and 4 hours after the end of the feed. The reaction mixture was then cooled to 20° C. and a sample was taken for further analysis: the conversion of MAA and MMA as determined with liquid chromatography and gas chromatography was 96.9% and 95.8%, respectively. For preparing the diblock copolymer, the obtained block [A] reaction mixture was purged with nitrogen for 20 minutes. The temperature was then raised to 80° C. and 50% of an initiator mixture of 0.8 gram AMBN and 55 gram MEK was added, followed by the gradual addition of 203 gram (1.4 mol) BMA. The monomer feed addition lasted 4 hours under a nitrogen atmosphere and at a controlled temperature of 80° C. After completion of the feed, the feed tank was rinsed with 10 gram MEK and the reaction mixture was kept for 8 hours at 80° C. The remaining initiator mixture was added to the reactor in two equally divided shots at the end of the feed and 4 hours after the end of the feed. The reaction mixture was then cooled to 20° C. and a sample was withdrawn for further analysis. The conversion of BMA as determined with gas chromatography was 90% and the solids level was determined at 50%. SEC analysis of oligomer 2 resulted in the following values: Mw=6344 g/mol, PDI=1.67

An aqueous dispersion of oligomer 2 was prepared as follows: a mixture of 100 gram deionized water and 25.0 gram ammonia (25%) was added to a mixture of approximately 450 gram oligomer 2 and 50 gram MEK at 35° C. Following 20 minutes of mixing, 561 gram deionized water was added in 20 minutes and the residual organic solvents were removed by distillation. A stable aqueous dispersion was obtained of which the pH was adjusted to 7.9 by addition of ammonia, and the final solids content after addition of extra deionized water was determined at 11.4%. The obtained dispersion had an average particle size of 15 nm (polydispersity 0.287).

Oligomer 3

Oligomer 3 was synthesized following a similar recipe and procedure as applied for the synthesis of oligomer 1, but without the deactivation of the cobalt catalyst. This was done as follows: after completion of the block [A] synthesis following the same recipe and procedure as applied for oligomer 1, the BMA monomer feed was gradually added over a period of 2 hours to the reaction mixture while keeping the reaction mixture at 70° C. and using ACVA as initiator (at 0.9 wt % on BMA monomer). The BMA monomer feed was purged with nitrogen for 30 minutes prior to start of the feed. At the end of the feed the reaction mixture was kept for 60 minutes at 70° C. and then cooled to ambient temperature. The conversion of BMA as determined with gas chromatography was >99% and the solids level was determined at 25.6%.

Oligomer 4

Synthesis of an MMA (70 wt %)/MAA (30 wt %) oligomer according the LMP1 oligomer recipe and procedure as disclosed in WO95/04767. The final solids content after addition of extra deionized water to control the viscosity was determined at 22%. The obtained dispersion had an average particle size of 201 nm (polydispersity 0.05).

Example 1

106 gram of deionized water and 24.7 gram of oligomer 1 (31.9% in water) were added to a 0.5 L flask equipped with stirrer, condenser cooler and temperature measuring probe. The reaction mixture was heated while stirring to 35° C. under nitrogen atmosphere and the pH of the reactor phase mixture was increased from 3.3 to 7.2 by dropwise addition of 2.8 gram ammonia (12.5%). Upon increasing the pH the appearance of the reactor phase changed from white to clear transparent, indicating near complete dissolution of the oligomer. The reactor phase was then heated to 85° C. under nitrogen atmosphere. At 85° C. a pre-emulsified monomer mixture consisting of in total 40.3 gram deionized water, 2.5 gram SLS (30 wt % in water), 63.0 gram BA, 86.9 gram MMA and 0.37 gram ammonia (25%) was gradually added over a period of 2.5 hours. In parallel to this feed, an initiator feed mixture of 0.42 gram APS and 45.3 gram deionized water set at a pH of about 8 with ammonia was added over a time period of 2.5 hours. The monomer and initiator feeds were started simultaneously. At the end of both feeds the feed tanks were rinsed with a total of approximately 25 grams deionized water and the reaction mixture was mixed for 30 more minutes at 85° C. The resultant emulsion was then cooled to room temperature and the pH of the final latex was set adjusted from 6.7 to 8.2 by addition of ammonia (12.5%). The solids content was measured at 38.1% and the particle size of the obtained emulsion was determined at 68 nm (polydispersity 0.05). SEC analysis resulted in an average Mw=99605 g/mol and a PDI=4.10

Example 2 was prepared according a similar recipe and procedure as applied for Example 1, where the pre-emulsified monomer feed was replaced by a surfactant-free monomer feed, simply by removing the deionized water and SLS from the feed. Final solids content was measured at 38.0% and the particle size was determined at 71 nm (polydispersity 0.09). Upon preparing a final sample for SEC analysis it was found that filtration of the final sample as dissolved in the SEC eluent was difficult. SEC analysis of the filtered material resulted in the following values: average Mw=118798 g/mol and a PDI=12.47.

Comparative Example 1 was prepared according a similar recipe and procedure as applied for Example 1, where oligomer 1 was replaced by oligomer 2 on equal solids level. Extra deionized water was added to reduce the viscosity of the emulsion. Final solids content was measured at 29.9% and the particle size was determined at 39 nm (polydispersity 0.23). SEC analysis resulted in the following values: Mw=156022 g/mol, PDI=6.11.

Comparative Example 2 is an emulsion polymer that does not contain an oligomer but is based on the same overall composition as Example 1. The overall monomer composition of CE2 is similar to the combined monomer composition of the oligomer and polymer of Example 1. In addition, to the reactor phase of the CE2 preparation a similar amount of SLS was added as used for the oligomer preparation in EX1. The synthesis of CE2 was as follows:

461 gram of deionized water and 0.30 gram of SLS (30% in water) were added to a 2 L flask equipped with stirrer, condenser cooler and temperature measuring probe. The reactor phase was heated to 85° C. under nitrogen atmosphere. At 85° C. a pre-emulsified monomer mixture consisting of in total 152 gram deionized water, 9.5 gram SLS (30 wt % in water), 6.1 gram MAA, 14.3 gram BMA, 237.8 gram BA, 340.2 gram MMA and 1.4 gram ammonia (25%) was gradually added over a period of 2.5 hours. In parallel to this feed, an initiator feed mixture of 1.6 gram APS and 171 gram deionized water set at a pH of about 8 with ammonia was added over 2.5 hours. The monomer and initiator feeds were started simultaneously. At the end of both feeds the feed tanks were rinsed with a total of approximately 72 grams deionized water and the reaction mixture was mixed for 30 more minutes at 85° C. The resultant emulsion was then cooled to room temperature and the pH of the final latex was set to 8.0 by addition of ammonia (25%). The solids content was measured at 40.7% and the particle size of the obtained emulsion was determined at 311 nm (polydispersity 0.02). Upon preparing a final sample for SEC analysis it was found that filtration of the final sample as dissolved in the SEC eluent was difficult. SEC analysis of the filtered material resulted in the following values: Mw=323783 g/mol, PDI=18.56.

Comparative Example 3 is a neutralized version of oligomer 1 and was prepared as follows: 2.1 gram of ammonia (25%) was dropwise added to 35.3 gram of oligomer 1 dispersion under adequate agitation and at ambient temperature, resulting in a clear aqueous dispersion of oligomer 1 (pH around 7.5 and 30% solids). The particle size of the dispersion was determined at 52 nm (polydispersity 0.184).

Comparative Example 4 is oligomer 2 (pH 7.9, 11.4% solids).

Comparative Example 5 was prepared according a similar recipe and procedure as applied for Example 1, where oligomer 1 was replaced by oligomer 3 on equal solids level. Viscosity during processing increased significantly, especially after completion of the monomer feed (during postreaction). Fouling/grit formation also increased during processing, which indicates a certain level of colloidal instability. As a result, the binder could not be filtered. Final solids content after addition of extra deionized water was measured at 28% and the particle size was determined at 3371 nm (polydispersity 1.00), indicating a very broad particle size distribution with multiple fractions of large particles.

Comparative Example 6 was prepared according a similar recipe and procedure as applied for Example 1, where oligomer 1 was replaced by oligomer 4 on equal solids level. During processing the viscosity of the binder increased significantly and grit formation also increased significantly. As a result, the binder could not be filtered. Final solids content after addition of extra deionized water was measured at 32% and the particle size was determined at 188 nm (polydispersity 0.38).

Comparative Example 7 was prepared according a similar recipe and procedure as applied for Comparative Example 6, where the amount of oligomer 4 was increased to the level as applied in Example 1 of WO95/04767 (37.5% on total final solids). During processing the viscosity of the binder increased to very high values (>10 Pas) and as a result the binder could not be filtered. Level of grit formation was however acceptable and much lower than CE6. Final solids content was measured at 24.2%. The final binder was translucent (indicating presence of small particles), however, the particle size was determined at 207 nm (polydispersity 0.14) which indicates the presence of a fraction of larger particles.

The specifications of the (comparative) examples are given in Table 2 and 3. Solids level was gravimetrically determined. Final free monomer levels were all below 500 ppm, except for CE2 (around 600 ppm), CE5 (around 700 ppm) and CE6 (around 650 ppm). All emulsion polymers, except CE5 and CE6, were processed with little or no fouling and/or grit formation.

TABLE 2

| Example | Solids [%] | pH [—] | Viscosity (Brookfield) [mPa · s] | Particle size (poly) (DLS) [nm] | Mw (PDI) (SEC) [kg/mol] |
|---|---|---|---|---|---|
| EX1 | 38.1 | 8.2 | 684 | 68 (0.05) | 100 (4.1) |
| EX2 | 38.0 | 8.0 | 365 | 71 (0.09) | 119 (12.5) |
| CE1 | 29.9 | 8.3 | 63 | 39 (0.23) | 156 (6.1) |
| CE2 | 40.7 | 8.0 | 8 | 311 (0.02) | 324 (18.6) |
| CE3 | 31.9 | 7.5 | n.d. | 52 (0.184) | 5.7 (1.73) |

TABLE 2-continued

| Example | Solids [%] | pH [—] | Viscosity (Brookfield) [mPa · s] | Particle size (poly) (DLS) [nm] | Mw (PDI) (SEC) [kg/mol] |
|---|---|---|---|---|---|
| CE4 | 11.4 | 7.8 | n.d. | 15 (0.287) | 6.3 (1.67) |
| CE5 | 28.3 | 9.4 | 3810 | 3371 (1.0) | n.d. |
| CE6 | 32.0 | 8.0 | 1420 | 188 (0.38) | n.d. |
| CE7 | 24.2 | 8.3 | 14220 | 207 (0.14) | n.d. | n.d. = not determined

The high particle size of >300 nm as measured for emulsion polymer CE2, which has the same overall composition as the EX1 but without the use of oligomer 1 as stabilizer, demonstrates that the low particle size of EX1 (as well as of EX2) is due to the advantageous stabilization properties of oligomer 1. Similarly, a high particle size and/or very high viscosity at relatively low binder solids was measured for CE5, CE6 and CE7, which demonstrates that the stabilizing properties of oligomer 3 and 4 are not as good as of the block copolymer (oligomer 1) prepared according the process of the invention.

The color and odor properties of the prepared polymer dispersions was compared as well. As indicated in Table 3 below, the RAFT-derived polymers CE1 and in particular CE4 exhibit a characteristic unpleasant sulfur-like odor and an undesired yellowish color, whereas the CCTP-derived polymers (oligomer 1 and EX1, EX2, CE3) had a very mild odor and no color. The color of the dispersions was determined following Gardner Liquid Color Standards ASTM D 1544, which range from water white (1) through yellow to deep amber (18). The dispersions were all pre-diluted to an equal solids level of either 28% (EX1 & 2, CE1 & 2) or 11% (BCP dispersions according CE3 & 4) to allow a fair comparison.

TABLE 3

| Example | Color following Gardner Liquid Color Standards range from 1 (water white) to 18 (deep amber) | Odor |
|---|---|---|
| EX1 (diluted to 28% solids) | 1 | Very mild |
| EX2 (diluted to 28% solids) | 1 | Very mild |
| CE1 (diluted to 28% solids) | 3 (yellowish) | Strong (sulfur) |
| CE2 (diluted to 28% solids) | 1 | Very mild |
| CE3 (diluted to 11% solids) | 1 | Very mild |
| CE4 (diluted to 11% solids) | 7-8 (strong yellow) | Very strong (sulfur) |

A basic key requirement for coating compositions is that these provide good protection against water and have good mechanical properties. To determine the performance of the emulsion polymers as binders in a coating composition were formulated with coalescents via addition of a butyl glycol/Dowanol DPnB (2/1 w/w) cosolvent mix at a level of 8 wt % calculated on total binder of 40% solids. The coalescents were slowly added to the binder under adequate agitation as a 1:1 mixture with deionized water (set to pH 8), followed by 15 minutes mixing. Approximately 16 hours after cosolvent addition the coating formulations were applied on a Leneta chart and a glass plate at 100 to 125 microns wet film thickness (depending on the solids level). The coatings were left to dry at ambient temperature (23° C.) and 50% relative humidity for 4 hours, followed by 16 hours drying at 50° C. The dried coatings on the Leneta chart were then exposed to a water droplet for 1 hour and for 24 hours and the impact of the water on the coating was visually determined after removing the water spot and after 24 hours of recovery. Rating was done on a scale from 1 to 5, with 1 being very poor (film permanently damaged) and 5 being excellent (completely undamaged; no visual marks left).

TABLE 4

| Example | Water resistance 1 hr exposure (0-5; 0 = very poor, 5 = excellent) | Water resistance 24 hrs exposure (0-5; 0 = very poor, 5 = excellent) |
|---|---|---|
| EX1 | 5 | 5 |
| EX2 | 5 | 5 |
| CE2 | — | — |
| CE3 | 0 | 0 |
| CE5 | 5 | 3 |
| CE6 | 5 | 3 |
| CE7 | 5 | 1 |

As indicated in Table 4, the water resistance of a dry coating prepared from EX1 and EX2 (both BCP/P) is excellent whereas the water resistance for CE3 (BCP without P) is very poor. Already after 1 hour of exposure of the CE3 based coating to a water droplet the coating was permanently damaged and almost completely dissolved.

The coating formulation of CE2 showed complete de-wetting when applied on the Leneta chart with a low gloss non-homogeneous film after drying and could thus not be used for further testing. This is a direct result of the unfavorable high particle size of the emulsion which negatively affects wetting and film formation.

CE5 (based on oligomer 3) demonstrates that elimination of the deactivation step of the cobalt catalyst after preparing block [A] and before starting the preparation of block [B] (following the procedure as applied for oligomer 3) does not provide the same result as EX1 and EX2. The particle size of oligomer 3 after neutralization to pH 7-8 is much higher than that of oligomer 1 after neutralization to pH 7-8, which is a result of poor block copolymer formation and hence poorer stabilization properties in preparation of polymer P. The final CE5 polymer dispersion does not have the favorable low particle size as that of EX1 and EX2, and results in Table 4 also show that the 24 hrs water resistance of CE5 it is also less good than of EX1 and EX2.

CE6 shows that replacement of the 5 wt % oligomer 1 (block copolymer) in EX1 with 5 wt % of oligomer 4 (macromonomer block [A] composition following LMP1 in WO95/04767) results in much poorer particle stabilization in preparation of polymer P, which is evident from the high particle size and high viscosity. The dried coating prepared from CE6 has an undesired matt (low gloss) film appearance and less good 24 hours water resistance as compared to the dried coating from EX1 and EX2. A further increase in the amount of oligomer 4 from 5 wt % (CE6) to 37.5 wt % (CE7) provides a low particle size emulsion similar as EX1 and EX2 and improved colloidal stability versus CE6, but the 24 hours water resistance is completely lost.

In addition, the clear coat formulations of EX1, EX2 and CE3 as applied and dried on the glass plate were evaluated on mechanical properties via a nail scratch test. It was found that the coating based on CE3 could easily be damaged and scraped off the glass plate by finger nail, whereas this was not the case for the coatings based on EX1 and EX2; those remained undamaged and completely intact. This result indicates that EX1 and EX2 have superior mechanical properties compared to CE3.

The invention claimed is:

1. A process for preparing a waterborne dispersion comprising
    (A) amphiphilic block copolymer comprising at least blocks [A] and [B], whereby
        block [A] comprises ethylenically unsaturated monomer(s) bearing acid-functional groups (monomer(s) (i)), and
        block [B] comprises ethylenically unsaturated monomer(s) different from monomer(s) (i) (monomer(s) (ii)); and
    (B) polymer P comprising ethylenically unsaturated monomer(s) different from monomer(s) (i) (monomer(s) (iii)),
    whereby the amount of the amphiphilic block copolymer is higher than 0.5 and lower than 50 wt. %, based on the total weight of monomers used to prepare the amphiphilic block copolymer and polymer P, characterized in that the process comprises at least the following steps:
    (I) subjecting at least ethylenically unsaturated monomer(s) (i) bearing acid-functional groups to a free-radical polymerization process in an aqueous medium in the presence of a free radical initiator and a cobalt chelate complex to obtain block [A],
    (II) subjecting at least ethylenically unsaturated monomer(s) (ii) different from monomer(s) (i) to an emulsion polymerization process in aqueous medium in the presence of block [A] and a free radical initiator, whereby the amount of ethylenically unsaturated monomer(s) (ii) in block [B] is at least 70 wt. %, relative to the total weight amount of monomers used to prepare block [B] and whereby the ethylenically unsaturated monomer(s) (ii) is (are) selected from the group consisting of methacrylic acid esters, dialkyl esters of itaconic acid, methacrylonitrile, α-methyl styrene and any mixture thereof,
    (III) subjecting at least ethylenically unsaturated monomer(s) (iii) different from monomer(s) (i) to an emulsion polymerization process in aqueous medium at a pH in the range of from 5 to 10 in the presence of the amphiphilic block copolymer to obtain an amphiphilic block copolymer-polymer P, and the process further comprises deactivating the cobalt chelate complex, which remains from step (I), prior to and/or during step (II).

2. The process according to claim 1, wherein the ethylenically unsaturated monomer(s) bearing acid-functional groups (monomer(s) (i)) is selected from the group consisting of acrylic acid, methacrylic acid, itaconic acid, monoalkyl itaconic acid and any mixture thereof.

3. The process according to claim 1, wherein the monomer system used in step (I) comprises ethylenically unsaturated monomer(s) bearing acid-functional groups (monomer(s) (i)) and ethylenically unsaturated monomer(s) not bearing acid-functional groups (monomer(s) (iv)), resulting in block [A] comprising monomer(s) (i) and (iv).

4. The process according to claim 3, wherein the monomer system used in step (I) comprises 5-100 wt. % of monomers (i) and 95-0 wt. % of monomers (iv), whereby the amounts of monomer(s) (i) and (iv) are given relative to the summed amount of monomers (i) and (iv).

5. The process according to claim 3, wherein the ethylenically unsaturated monomer(s) (iv) are selected from the group consisting of methacrylic acid esters, dialkyl esters of itaconic acid, methacrylonitrile, a-methyl styrene and any mixture thereof.

6. The process according to claim 1, wherein the summed amount of methacrylic acid, itaconic acid, methacrylic acid esters, dialkyl esters of itaconic acid, methacrylonitrile and a-methyl styrene in the amphiphilic block copolymer is at least 75 wt. % based on the total weight of monomers used to prepare the amphiphilic block copolymer.

7. The process according to claim 1, wherein the summed amount of methacrylic acid and methacrylic acid esters in the amphiphilic block copolymer is at least 75 wt. % based on the total weight of monomers used to prepare the amphiphilic block copolymer.

8. The process according to claim 1, wherein at least 90 wt. % of the total amount of monomers (i) present in the block copolymer-polymer composition is present in block [A].

9. The process according to claim 1, wherein the amount of ethylenically unsaturated monomer(s) (ii) in block [B] is at least 75 wt. % relative to the total weight amount of monomers used to prepare block [B].

10. The process according to claim 1, wherein the ethylenically unsaturated monomer(s) (ii) is (are) selected from the group consisting of methyl methacrylate, ethyl methacrylate, n-butyl methacrylate, 2-ethylhexyl methacrylate, cyclohexyl methacrylate and any mixture thereof.

11. The process according to claim 1, wherein the free radical initiator used in step (I) is 4,4'-azobis(4-cyanovaleric acid).

12. The process according to claim 1, wherein cobalt chelate complex comprises BF2 bridging groups.

13. The process according to claim 1, wherein cobalt chelate complex is selected from the group consisting of
    bis[(difluoroboryl)dimethylglyoximato]cobalt(II),
    bis[(difluoroboryl)diethylglyoximato]cobalt(II) and any mixture thereof.

14. The process according to claim 1, wherein cobalt chelate complex is bis[(difluoroboryl)dimethylglyoximato]cobalt(II).

15. The process according to claim 1, wherein the process comprises neutralizing at least a part of the acid-functional groups present in block [A] before, during and/or after step (II) and/or at the start of step (III) to obtain the pH in the range of from 5 to 10.

16. The process according to claim 1, wherein deactivating the cobalt chelate complex which remains from step (I) is effected by increasing the temperature to at least 80° C. after step (I) and prior to step (II) and by effecting step (II) in the presence of a persulfate and/or peroxide as free radical initiator.

17. The process according to claim 1, wherein steps (I) and (II) are performed sequentially as a one-pot procedure.

18. The process according to claim 1, wherein step (I) is an emulsion polymerization effected in water in the presence of a stabilizer in an amount from 0.1 to 3 wt. % based on the total weight of monomers used to prepare block [A].

19. The process according to claim 1, wherein the amount of the amphiphilic block copolymer is from 1 to 30 wt. %, based on the total weight of monomers used to prepare the block copolymer and polymer P.

20. The process according to claim 1, wherein the weight average molecular weight of block [A] of the amphiphilic block copolymer is in the range of from 500 to 20,000 g/mol.

21. The process according to claim 1, wherein the weight average molecular weight of the amphiphilic block copolymer is in the range of from 1,000 to 100,000 g/mol.

22. The process according to claim 1, wherein the weight average molecular weight of the dispersion is higher than 50 kg/mol.

23. A polymeric composition obtained and/or obtainable by the process claimed in claim 1.

24. An adhesive, coating, paint or ink composition comprising the block copolymer-polymer prepared according to the process claimed claim 1.

* * * * *